US008486285B2

(12) United States Patent
Zhou et al.

(10) Patent No.: US 8,486,285 B2
(45) Date of Patent: Jul. 16, 2013

(54) DAMASCENE WRITE POLES PRODUCED VIA FULL FILM PLATING

(75) Inventors: Ronghui Zhou, Fremont, CA (US);
Ming Jiang, San Jose, CA (US);
Xiaohai Xiang, Danville, CA (US);
Jinwen Wang, Fremont, CA (US);
Guanghong Luo, Fremont, CA (US);
Yun-Fei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 767 days.

(21) Appl. No.: 12/544,998

(22) Filed: Aug. 20, 2009

(65) Prior Publication Data
US 2011/0042349 A1 Feb. 24, 2011

(51) Int. Cl.
*B44C 1/22* (2006.01)
(52) U.S. Cl.
USPC ............ 216/22; 438/424; 438/692; 29/603.16
(58) Field of Classification Search
USPC ............... 205/296, 85; 216/22; 257/751, 758;
29/603.14, 603.16; 360/110, 125.02, 125.03,
360/125.04, 125.06, 125.3, 125.38, 313,
360/319; 427/131; 428/846.3; 438/424, 597,
438/631, 633, 687, 692, 697, 699, 724, 734
See application file for complete search history.

(56) References Cited

U.S. PATENT DOCUMENTS

| 4,274,022 A | 6/1981 | Elsel |
| 4,404,609 A | 9/1983 | Jones, Jr. |
| 4,523,372 A * | 6/1985 | Balda et al. ............. 438/623 |
| 4,546,398 A | 10/1985 | Toda et al. |
| 4,636,897 A | 1/1987 | Nakamura et al. |
| 4,646,429 A | 3/1987 | Mori |
| 4,779,463 A | 10/1988 | Woodruff |
| 4,855,854 A | 8/1989 | Wada et al. |
| 4,943,882 A | 7/1990 | Wada et al. |
| 5,027,247 A | 6/1991 | Nakanishi |
| 5,181,151 A | 1/1993 | Yamashita et al. |
| 5,225,953 A | 7/1993 | Wada et al. |
| 5,393,233 A | 2/1995 | Hong et al. |
| 5,404,635 A * | 4/1995 | Das ............................ 29/603.15 |
| 5,578,857 A | 11/1996 | Hong et al. |
| 6,063,711 A | 5/2000 | Chao et al. |
| 6,072,672 A | 6/2000 | Westwood |
| 6,093,656 A * | 7/2000 | Lin ............................. 438/734 |
| 6,211,090 B1 | 4/2001 | Durlam et al. |
| 6,261,918 B1 | 7/2001 | So |
| 6,292,329 B1 | 9/2001 | Sato et al. |
| 6,315,839 B1 | 11/2001 | Pinarbasi et al. |
| 6,353,995 B1 | 3/2002 | Sasaki et al. |
| 6,391,757 B1 | 5/2002 | Huang et al. |

(Continued)

*Primary Examiner* — Duy Deo
*Assistant Examiner* — Erin Bergner (57) ABSTRACT

A method for forming a write pole comprises forming a stop layer over a substrate layer of a wafer, the stop layer having an opening above a damascene trench in the substrate layer, and forming a buffer layer over the stop layer, the buffer layer having an opening above the opening of the stop layer. The method further comprises plating a layer of magnetic material over the wafer, disposing a first sacrificial material over a region of the magnetic material above the damascene trench, performing a milling or etching operation over the wafer to remove the magnetic material not covered by the first sacrificial material and to remove the first sacrificial material, disposing a second sacrificial material over the wafer, and performing a polishing operation over the wafer to remove the region of the magnetic material above the damascene trench, the second sacrificial material, and the buffer layer.

18 Claims, 9 Drawing Sheets

U.S. PATENT DOCUMENTS

| | | |
|---|---|---|
| 6,433,970 B1 | 8/2002 | Knapp et al. |
| 6,475,062 B1 | 11/2002 | Kubota et al. |
| 6,501,619 B1 | 12/2002 | Sherrer et al. |
| 6,504,675 B1 | 1/2003 | Shukh et al. |
| 6,513,228 B1 | 2/2003 | Khizroev et al. |
| 6,522,007 B2 | 2/2003 | Kouno et al. |
| 6,564,445 B1 | 5/2003 | Hashimoto et al. |
| 6,587,314 B1 | 7/2003 | Lille |
| 6,709,322 B2 | 3/2004 | Saldana et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,784,548 B2 | 8/2004 | Kouno et al. |
| 6,807,027 B2 | 10/2004 | McGeehin et al. |
| 6,808,442 B1 | 10/2004 | Wei et al. |
| 6,809,899 B1 | 10/2004 | Chen et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,875,371 B1 * | 4/2005 | Ko et al. .................. 252/79.1 |
| 6,876,518 B2 | 4/2005 | Khizroev et al. |
| 6,876,519 B1 | 4/2005 | Litvinov et al. |
| 6,949,833 B2 * | 9/2005 | O'Kane et al. ................ 257/773 |
| 6,952,867 B2 | 10/2005 | Sato |
| 6,962,771 B1 | 11/2005 | Liu et al. |
| 7,029,376 B1 | 4/2006 | Guthrie et al. |
| 7,206,166 B2 | 4/2007 | Notsuke et al. |
| 7,227,720 B2 | 6/2007 | Sasaki et al. |
| 7,248,434 B2 * | 7/2007 | Dill et al. ................. 360/125.03 |
| 7,288,487 B1 | 10/2007 | Kang et al. |
| 7,296,339 B1 | 11/2007 | Yang et al. |
| 7,370,405 B2 | 5/2008 | Kuroda et al. |
| 7,508,627 B1 | 3/2009 | Zhang et al. |
| 7,518,824 B2 | 4/2009 | Sasaki et al. |
| 7,552,523 B1 * | 6/2009 | He et al. ..................... 29/603.16 |
| 2001/0008501 A1 | 7/2001 | Sekine |
| 2001/0027604 A1 * | 10/2001 | Huang et al. ............... 29/603.15 |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2003/0203510 A1 | 10/2003 | Hineman et al. |
| 2003/0219984 A1 * | 11/2003 | Ying et al. .................. 438/709 |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1 | 3/2006 | Le et al. |
| 2006/0139802 A1 | 6/2006 | Sasaki et al. |
| 2006/0168603 A1 | 7/2006 | Goto |
| 2006/0289034 A1 * | 12/2006 | Small et al. ................... 134/1.3 |
| 2008/0080233 A1 | 4/2008 | Hosotani et al. |
| 2008/0148301 A1 | 6/2008 | Masaoka et al. |
| 2008/0184278 A1 | 7/2008 | Leigh et al. |
| 2008/0316644 A1 | 12/2008 | Lee et al. |

* cited by examiner

DAMASCENE WRITE POLES PRODUCED VIA FULL FILM PLATING

FIELD OF THE INVENTION

The present invention generally relates to hard disk drives and, in particular, relates to producing damascene write poles via full film plating.

BACKGROUND OF THE INVENTION

Hard disk drives include one or more rigid disks, which are coated with a magnetic recording medium in which data can be stored. Hard disk drives further include read and write heads for interacting with the data in the magnetic recording medium. The write head includes an inductive element for generating a magnetic field that aligns the magnetic moments of domains in the magnetic recording medium to represent bits of data.

Magnetic recording techniques include both longitudinal and perpendicular recording. Perpendicular magnetic recording ("PMR") is a form of magnetic recording in which the magnetic moments representing bits of data are oriented perpendicularly to the surface of the magnetic recording medium, as opposed to longitudinally along a track thereof. PMR enjoys a number of advantages over longitudinal recording, such as significantly higher areal density recording capability.

Write poles with a trapezoidal cross-sectional shape at the air bearing surface ("ABS") are used to provide improved writing performance in PMR heads. The manufacture of write poles with this trapezoidal cross-sectional shape presents a number of difficulties, however. One approach to manufacturing such poles involves a reductive process of milling poles from a layer of magnetic material. Due to the complex three-dimensional shapes called for in next-generation hard disk drives, however, this process can be extraordinarily difficult and prone to low yields. Another approach to manufacturing these poles involves an additive process, in which damascene trenches are formed in an insulating substrate layer and filled with a magnetic material.

Figure 1A:
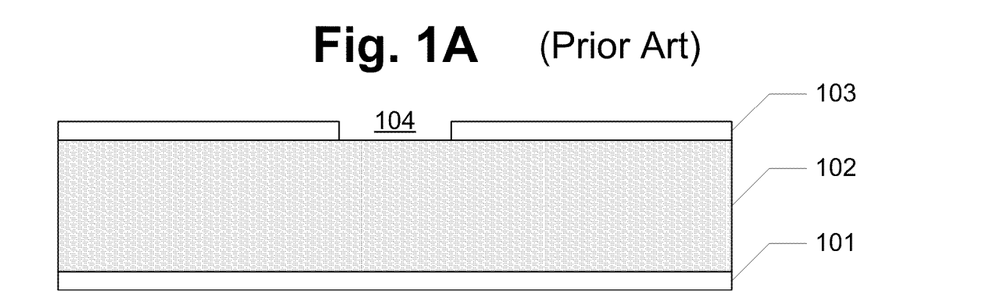
FIGS. 1A-1I illustrate structures formed after various steps in the formation of a write pole.
Figure 1B:
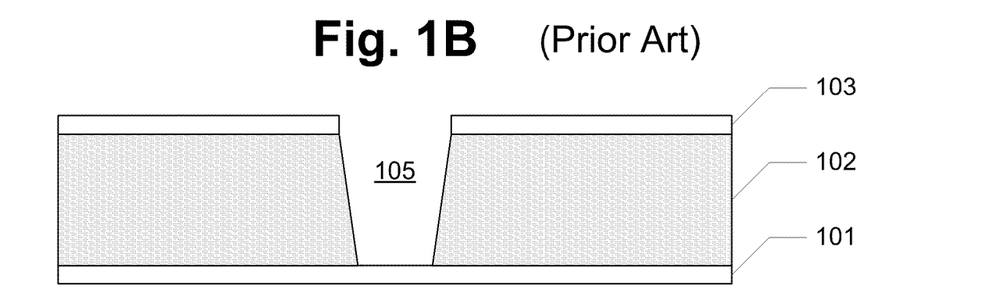
Figure 1C:
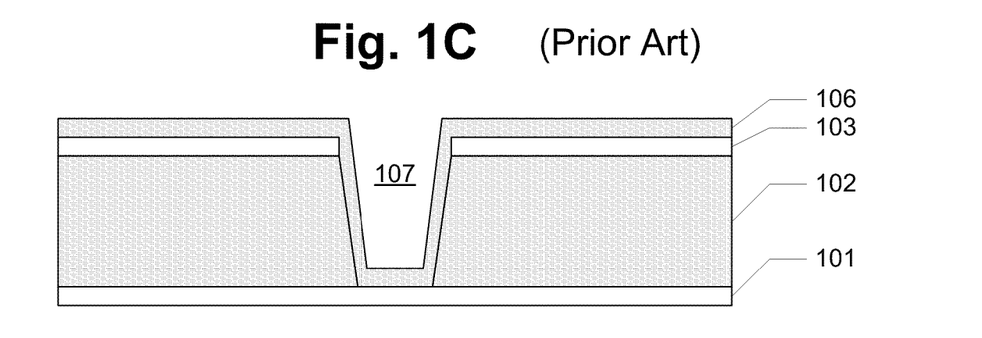

One such approach to forming a write pole is illustrated in FIGS. 1A-1I. As can be seen with reference to FIG. 1A, a patterned mask 103 of tantalum (Ta) is provided over a substrate 102 of alumina ($Al_2O_3$) disposed on a lower substrate 101 of chromium (Cr). Patterned mask 103 has an opening 104 over a region of substrate 102 where a damascene trench will be formed. By subjecting the structure of FIG. 1A to a reactive ion etching (RIE) operation, a damascene trench 105 is formed in substrate 102, as is illustrated in FIG. 1B. To control the final shape and track width of the pole, one or more layers of alumina, such as layer 106, may be disposed via atomic layer deposition (ALD) over the structure of FIG. 1B to provide a narrower damascene trench 107, as is illustrated in FIG. 1C.

Figure 1D:
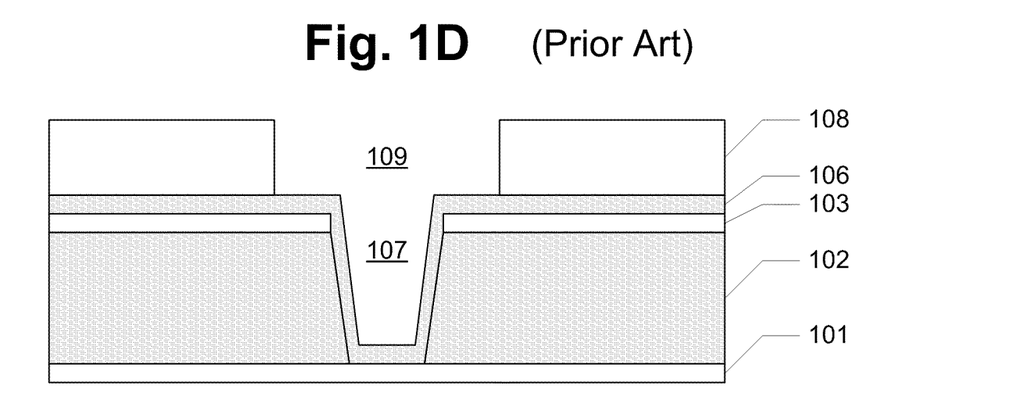
Figure 1E:
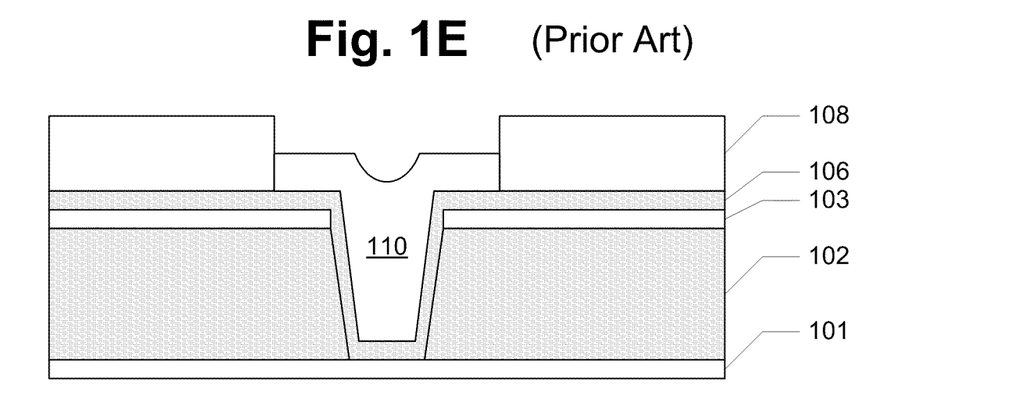
Figure 1F:
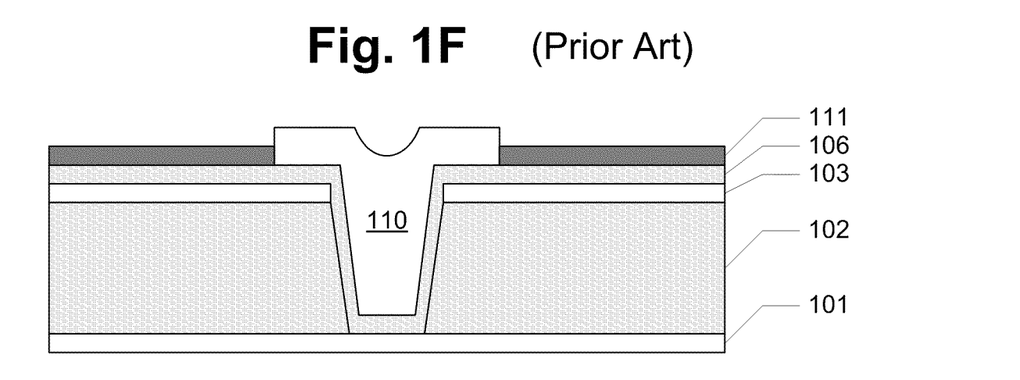

Turning to FIG. 1D, a layer of photoresist 108 is applied over the structure of FIG. 1C to open an area 109 over damascene trench 107. A high moment magnetic material 110, such as CoNiFe or the like, is then plated to fill the trench pattern formed by the foregoing photoresist process, as is illustrated in FIG. 1E. The photoresist is then stripped from the structure to create an open area on the field surrounding magnetic material 110, and a stop layer 111, such as diamond-like carbon (DLC), is deposited over the field area, as is illustrated in FIG. 1F. The stop layer allows a chemical mechanical polishing (CMP) operation to be used to remove excess magnetic material extending above the desired trailing edge of the write pole, as will be illustrated in greater detail below.

Figure 1G:
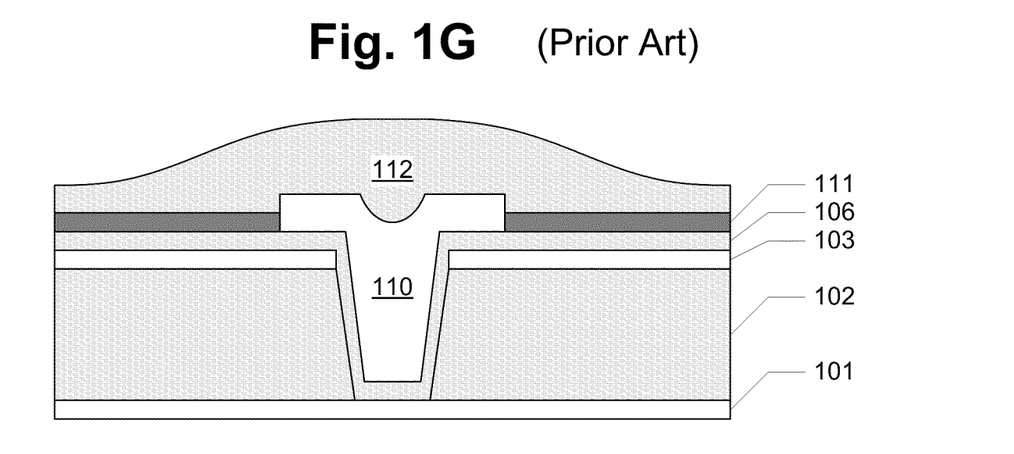
Figure 1H:
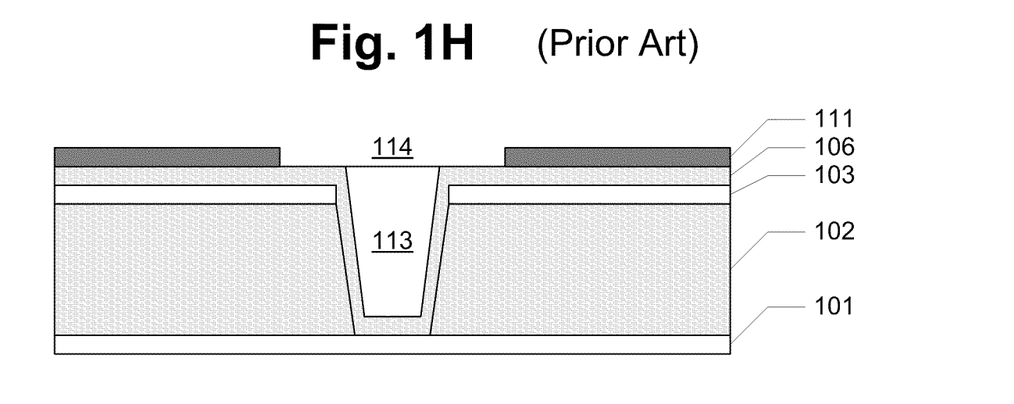
Figure 1I:
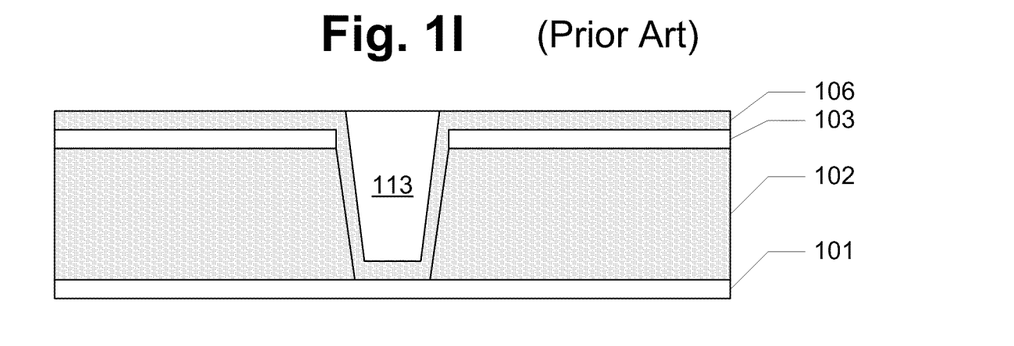

To facilitate the CMP process, another layer 112 of $Al_2O_3$ is provided over the structure of FIG. 1F, as is illustrated in FIG. 1G. The structure is subjected to the CMP process to planarize the surface on the top of stop layer 111, as is illustrated in FIG. 1H. The thickness and track width of write pole 113 are well preserved by stopping the CMP process within the thickness of stop layer 111, but where the stop layer has a gap 114 surrounding write pole 113, however, dishing in the trailing edge of write pole 113 may occur. In a final step, the remaining material from stop layer 111 is removed by another RIE process, as is illustrated in FIG. 1I.

While the foregoing process is capable of providing write poles with tightly controlled track widths and side wall angles, the use of photoresist to define a frame for plating the magnetic material may leave undesirable photoresist residue within the damascene trench and along the side walls of the write poles thus formed. Any photoresist residue can result in poor pole integrity and finishing, and may even result in device failure.

SUMMARY OF THE INVENTION

Various embodiments of the present invention solve the foregoing problems by providing methods for forming write poles that use a full-film plating of magnetic material to avoid surrounding a write pole with photoresist residue. Moreover, a full-film ion beam etch is used to remove excess magnetic material from the field area after full-film plating, greatly simplifying the pole formation process. A sacrificial buffer layer is provided between the full-film plated magnetic material and a CMP stop layer, such that the ion beam etching or milling used to remove the excess magnetic material does not reach the CMP stop layer and impact its effectiveness.

According to one embodiment of the subject disclosure, a method for forming a write pole comprises the step of forming a stop layer over a substrate layer of a wafer, the stop layer having an opening above a damascene trench in the substrate layer. The method further comprises the step of forming a buffer layer over the stop layer, the buffer layer having an opening above the opening of the stop layer. The method further comprises the steps of plating a layer of magnetic material over the wafer, disposing a first sacrificial material over a region of the magnetic material above the damascene trench, and performing a etching or milling operation over the wafer to remove the magnetic material not covered by the first sacrificial material and to remove the first sacrificial material. The method further comprises the steps of disposing a second sacrificial material over the wafer, and performing a polishing operation over the wafer to remove the region of the magnetic material above the damascene trench, to remove the second sacrificial material, and to remove the buffer layer.

According to another embodiment of the subject disclosure, a method for forming a plurality of write poles comprises the step of forming a stop layer over a substrate layer of a wafer, the stop layer having a first plurality of openings above a corresponding plurality of damascene trenches in the substrate layer. The method further comprises the step of forming a buffer layer over the stop layer, the buffer layer having a second plurality of openings above corresponding ones of the first plurality of openings of the stop layer. The method further comprises the steps of plating a layer of magnetic material over the wafer, disposing a first sacrificial material over a plurality of regions of the magnetic material above corresponding ones of the plurality of damascene trenches, and performing a milling or etching operation over the wafer to remove the magnetic material not covered by the first sacrificial material and to remove the first sacrificial material. The method further comprises the steps of disposing a second sacrificial material over the wafer and performing a polishing operation over the wafer to remove the plurality of regions of the magnetic material above the corresponding ones of the plurality of damascene trenches, to remove the second sacrificial material, and to remove the buffer layer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 2A:
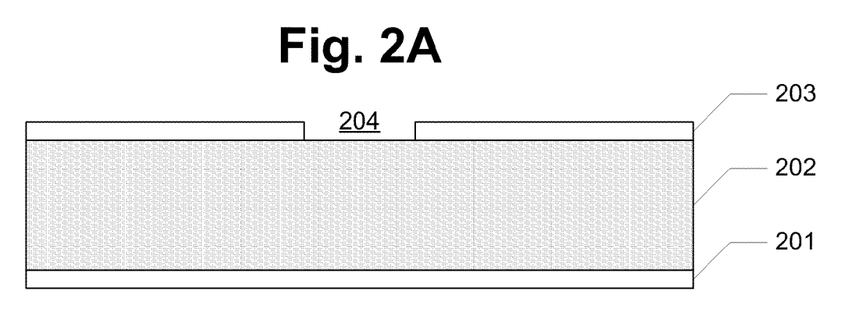
FIGS. 2A-2I illustrate structures formed after various steps in the formation of a write pole in accordance with one aspect of the subject disclosure.
Figure 2B:
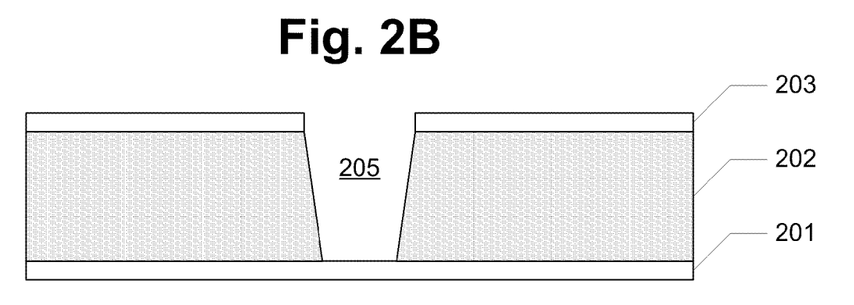
Figure 2C:
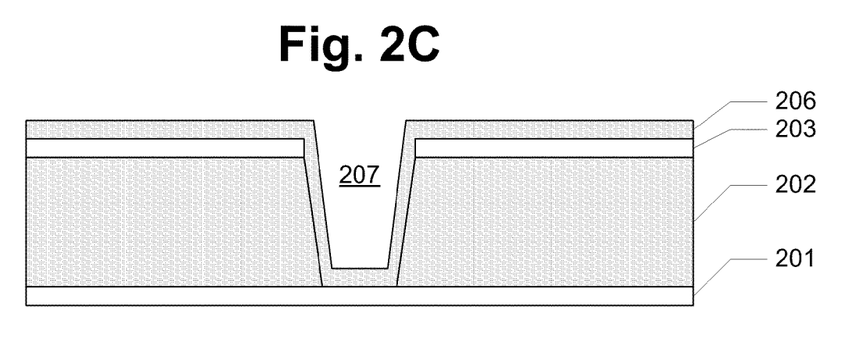

FIGS. 2A-2I illustrate structures formed after various steps in the formation of a write pole in accordance with one aspect of the subject disclosure. As can be seen with reference to FIG. 2A, a patterned mask 203 of tantalum (Ta) or the like is provided over a substrate 202 of alumina ($Al_2O_3$) disposed on a lower substrate 201 of chromium (Cr) or the like. Patterned mask 203 has an opening 204 over a region of substrate 202 where a damascene trench will be formed. By subjecting the structure of FIG. 2A to a reactive ion etching (RIE) operation, a damascene trench 205 is formed in substrate 202, as is illustrated in FIG. 2B. To control the final shape and track width of the pole, one or more layers of alumina, such as layer 206, may be disposed via atomic layer deposition (ALD) over the structure of FIG. 2B to provide a narrower damascene trench 207, as is illustrated in FIG. 2C.

Figure 2D:
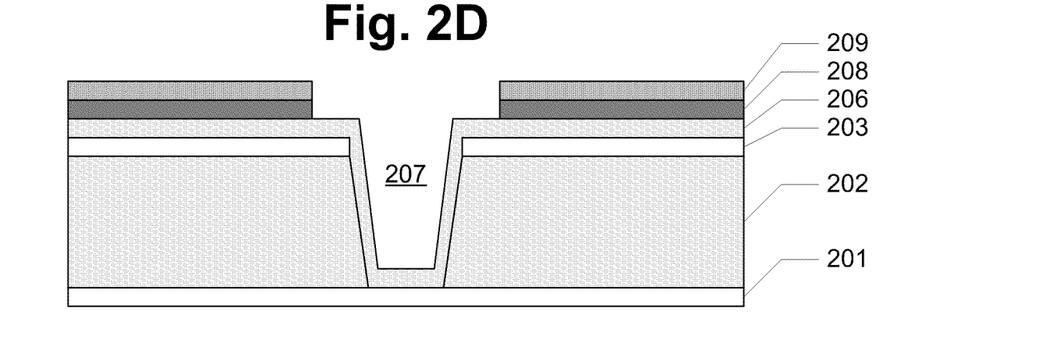
Figure 2E:
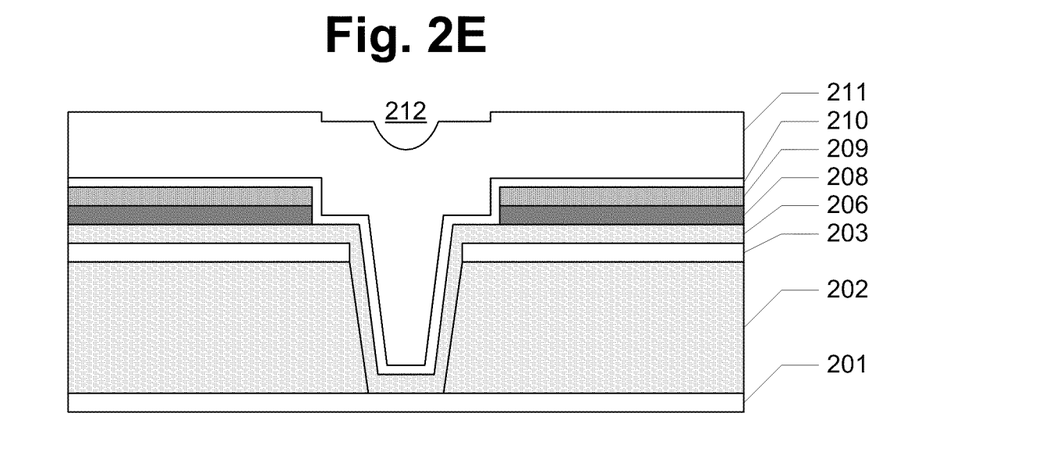

Turning to FIG. 2D, a CMP stop layer 208 of DLC or the like is provided over layer 206. According to one aspect of the subject disclosure, the material of CMP stop layer 208 may be selected such that a CMP selectivity (i.e., a relative rate of material removal) between the magnetic material and the stop layer material is greater than 300:1. As is also illustrated in FIG. 2D, a sacrificial buffer layer 209 of $AlO_x$ (where x is a positive integer) is provided over CMP stop layer 208 to protect CMP stop layer 208 from a subsequent milling or etching operation, as is set forth in greater detail below. In FIG. 2E, a seed layer 210 of ruthenium (Ru) or the like is provided over the wafer and a layer of high moment magnetic material 211, of CoNiFe, CoFe, NiFe or the like, is plated over the wafer above seed layer 210. In the region above damascene trench 207 thus filled by magnetic material, an indentation 212 may be formed.

Figure 2F:
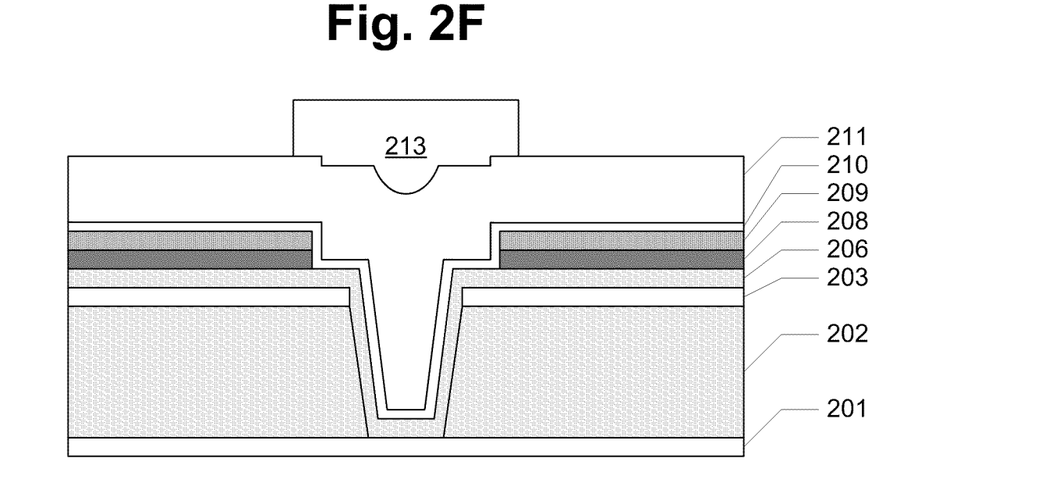

This indentation 212 may assist in aligning the application of a region of photoresist 213 as illustrated in greater detail with respect to FIG. 2F, below. Moreover, this indentation may allow for a subsequent CMP operation to more quickly remove the excess magnetic material from above the desired trailing edge of the write pole than would be possible if the excess material had a planar upper surface. As can be seen with reference to FIG. 2F, photoresist 213 serves as a mask to protect the region of magnetic material 211 covered thereby, such that a subsequent ion beam etching (IBE) or milling operation will not remove the magnetic material from the region immediately surrounding (and filling) the damascene trench. This is illustrated in greater detail with respect to FIG. 2G, in which the post-milling structure is illustrated.

Figure 2G:
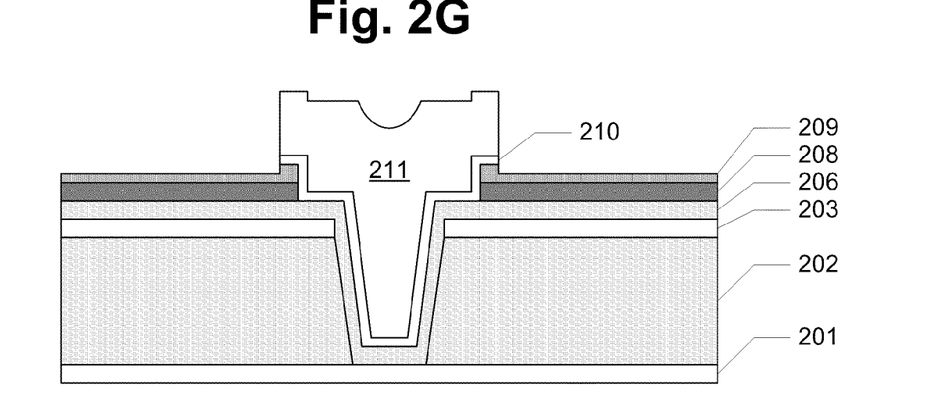

As can be seen with reference to FIG. 2G, the full-film IBE or milling operation removes most of photoresist material 213, the excess magnetic material and the seed layer material surrounding the pole region, but removes only part of the sacrificial buffer layer 209 of $AlO_x$. Buffer layer 209 has thereby served its purpose of protecting CMP stop layer 208 from being damaged by the milling or etching operation, ensuring that CMP stop layer will be able to provide a readily-detectable end-point for a subsequent CMP operation, as is set forth in greater detail below. The small protrusion of magnetic material 211 left after the etching or milling operation allow for shorter polishing times and higher planarization efficiency. Any residue from photoresist material 213 not removed by the full-film IBE or milling operation may be removed via lift-off at this time.

Figure 3:
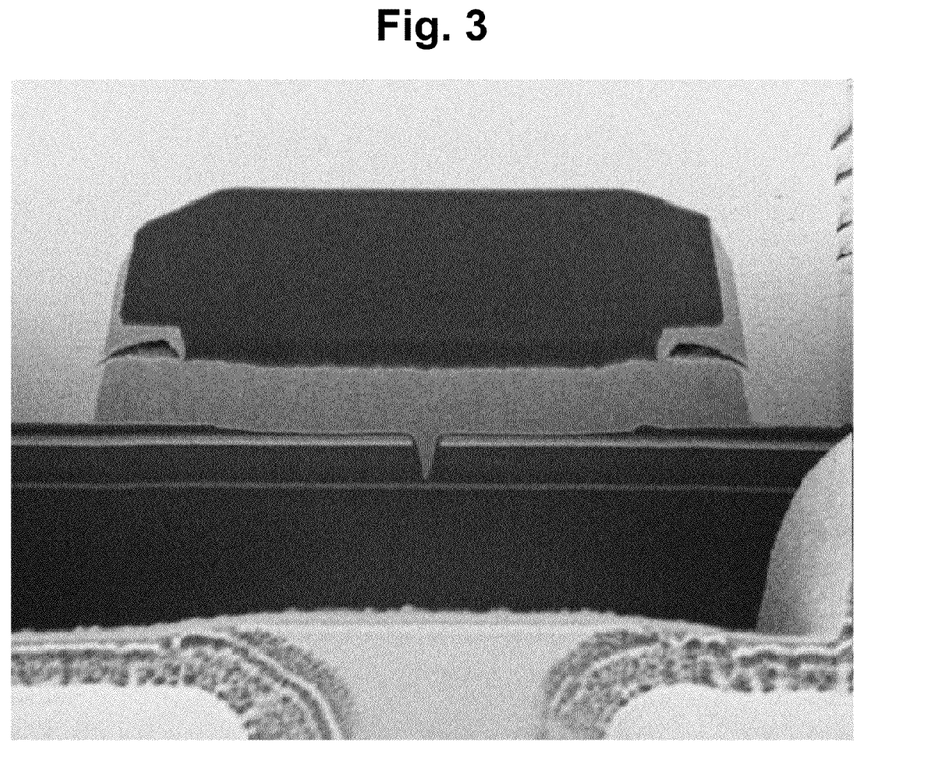
FIG. 3 is a scanning electron microscope image of a partially-formed write pole after excess magnetic material has been removed by a milling or etching operation in accordance with one aspect of the subject disclosure.

Turning ahead to FIG. 3, a scanning electron microscope image of a partially-formed write pole is illustrated in cross-section after the excess magnetic material has been removed by a milling or etching operation in accordance with one aspect of the subject disclosure. As can be seen with reference to FIG. 3, a portion of the $AlO_x$ buffer remains intact, protecting the CMP stop layer of DLC from the etching or milling operation.

Figure 2H:
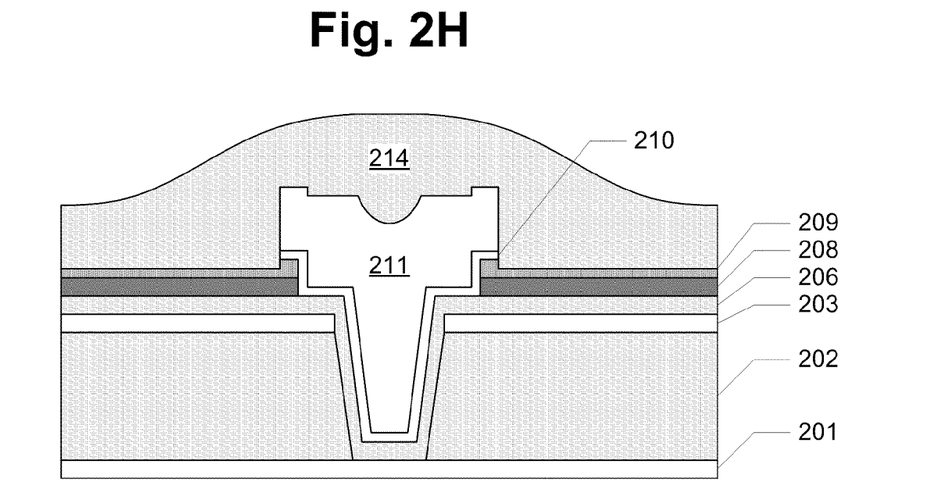
Figure 2I:
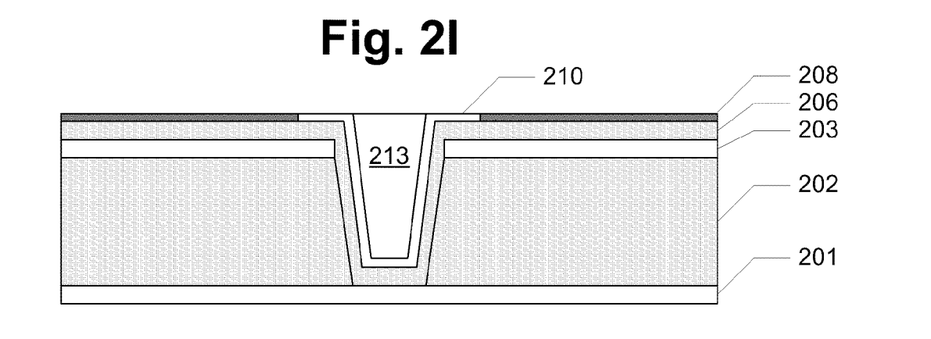

Returning to FIG. 2H, a sacrificial layer 214 of alumina or the like is disposed over the wafer, covering magnetic material 211 and providing a more uniform surface for a CMP operation. The CMP operation is performed, removing this sacrificial layer 214, the remaining buffer layer 209, and the excess magnetic material to form write pole 213. The CMP operation stops when the stop layer 208 is detected (e.g., when the polishing removal rate slows upon encountering the DLC). The remaining seed layer 210 of Ru may be used in a subsequent local CMP operation (as opposed to the foregoing global or wafer-wide CMP operation) as a per-write pole stop layer.

Figure 4:
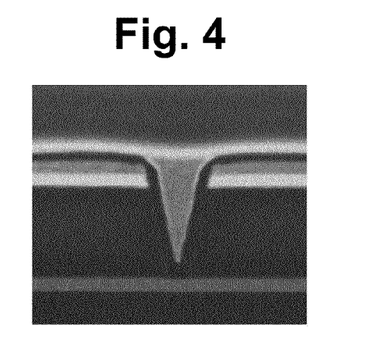
FIG. 4 is a scanning electron microscope image of a write pole formed in accordance with one aspect of the subject disclosure.

FIG. 4 is a scanning electron microscope image of a write pole formed in accordance with one aspect of the subject disclosure. As can be seen with reference to FIG. 4, the write pole experiences minimal dishing, and is free from the photoresist residue which can contaminate write poles produced with a framed plating approach.

Figure 5:
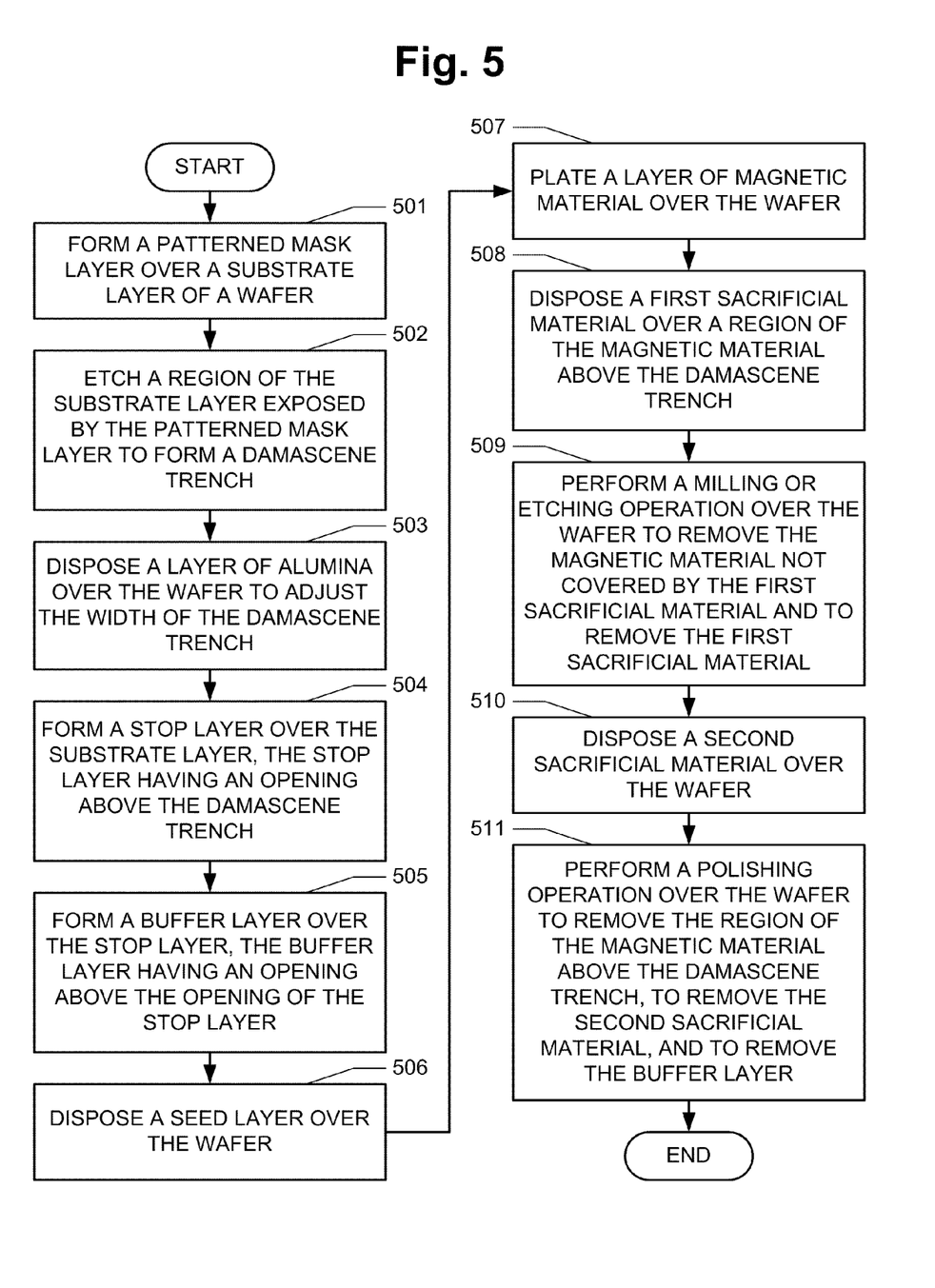
FIG. 5 is a flow chart illustrating a method for forming a write pole in accordance with one aspect of the subject disclosure.

FIG. 5 is a flow chart illustrating a method for forming a write pole in accordance with one aspect of the subject disclosure. The method begins with step 501, in which a patterned mask layer is formed over a substrate layer of a wafer. In step 502, a region of the substrate layer exposed by the patterned mask layer is etched to form a damascene trench in the substrate layer. In step 503, a layer of alumina is disposed over the wafer to adjust a width of the damascene trench. In step 504, a stop layer is formed over the substrate, the stop layer having an opening above the damascene trench. In step 505, a buffer layer is formed over the stop layer, the buffer layer having an opening above the opening of the stop layer. In step 506, a seed layer is disposed over the wafer, and in step 507, a layer of magnetic material is plated over the wafer. In step 508, a first sacrificial material is disposed over a region of the magnetic material above the damascene trench. In step 509, a milling or etching operation is performed over the wafer to remove the magnetic material not covered by the first sacrificial material and to remove the first sacrificial material. In step 510, a second sacrificial material is disposed over the wafer, and in step 511, a polishing operation is performed over the wafer to remove the region of the magnetic material above the damascene trench, to remove the second sacrificial material, and to remove the buffer layer.

Figure 6:
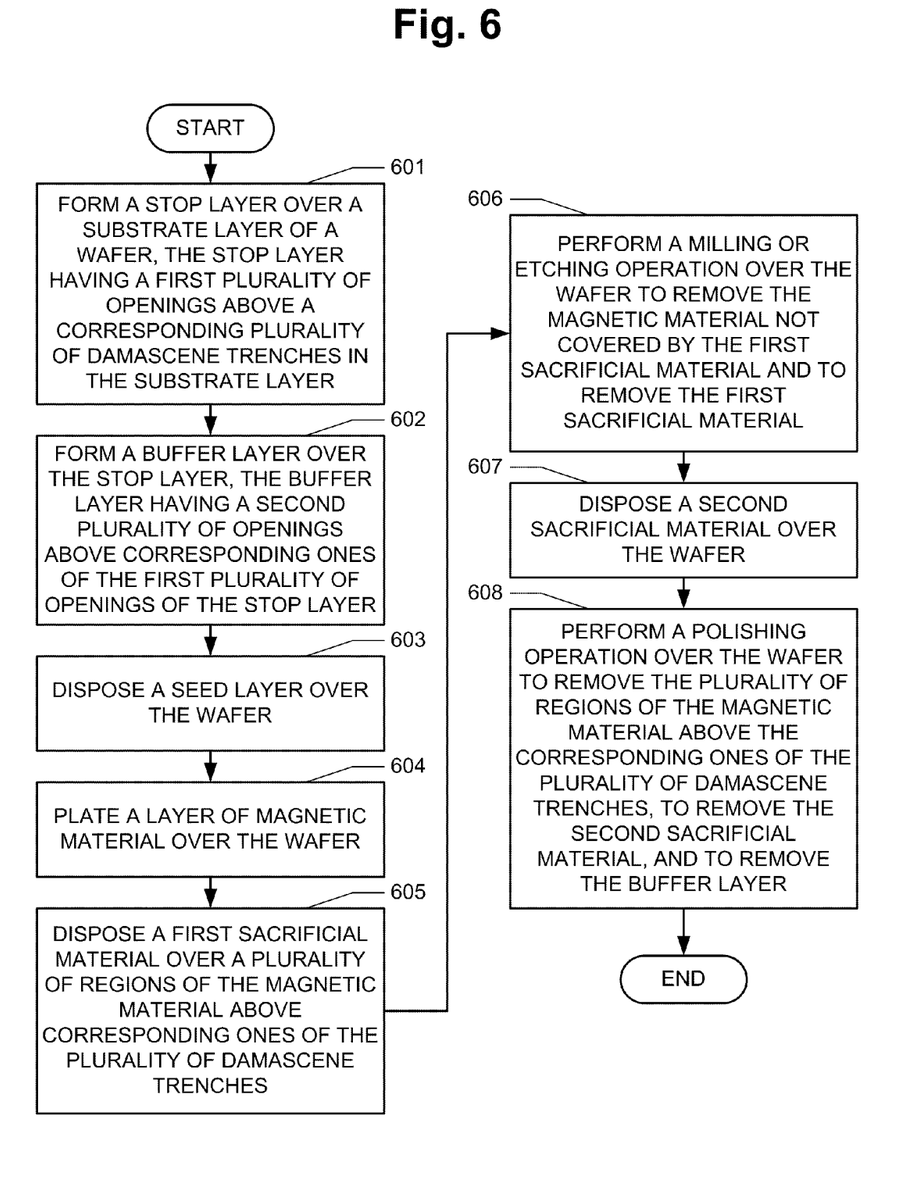
FIG. 6 is a flow chart illustrating a method for forming a plurality of write poles in accordance with one aspect of the subject disclosure.

While in the foregoing exemplary embodiments, the fabrication of a single write pole has been illustrated in detail, those of skill in the art will readily understand, in view of the subject disclosure, that the foregoing processes may be applied in the fabrication of multiple write poles in a single wafer. Indeed, the full-film plating and full-film IBE steps provide many advantages in a wafer fabrication process in which multiple write poles are formed, as will be readily understood. For example, FIG. 6 is a flow chart illustrating a method for forming a plurality of write poles in accordance with one aspect of the subject disclosure. The method begins with step 601, in which a stop layer is formed over a substrate layer of a wafer, the stop layer having a first plurality of openings above a corresponding plurality of damascene trenches in the substrate layer. In step 602, a buffer layer is formed over the stop layer, the buffer layer having a second plurality of openings above corresponding ones of the first plurality of openings of the stop layer. In step 603, a seed layer is disposed over the wafer, and in step 604, a layer of magnetic material is plated over the wafer. In step 605, a first sacrificial material is disposed over a plurality of regions of the magnetic material above corresponding ones of the plurality of damascene trenches. In step 606, a milling or etching operation is performed over the wafer to remove the magnetic material not covered by the first sacrificial material and to remove the first sacrificial material. In step 607, a second sacrificial material is disposed over the wafer. In step 608, a polishing operation is performed over the wafer to remove the plurality of regions of the magnetic material above the corresponding ones of the plurality of damascene trenches, to remove the second sacrificial material, and to remove the buffer layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a write pole, comprising the steps of:
   forming a damascene trench in a substrate layer of a wafer;
   forming a stop layer over the substrate layer of the wafer after the step of forming the damascene trench, the stop layer having an opening above the damascene trench in the substrate layer;
   forming a buffer layer over the stop layer, the buffer layer having an opening above the opening of the stop layer;
   plating a layer of magnetic material over the wafer after the stop layer and the buffer layer are formed;
   disposing a first sacrificial material over a region of the magnetic material above the damascene trench;
   performing a milling or etching operation over the wafer to remove the magnetic material not covered by the first sacrificial material and to remove the first sacrificial material;
   disposing a second sacrificial material over the wafer; and
   performing a polishing operation over the wafer to remove the region of the magnetic material above the damascene trench, to remove the second sacrificial material, and to remove the buffer layer.

2. The method according to claim 1, further comprising the step of disposing a seed layer over the wafer before plating the magnetic material over the wafer.

3. The method according to claim 2, wherein the step of performing the milling or etching operation further removes a portion of the seed layer not covered by the first sacrificial material.

4. The method according to claim 1, wherein the step of performing a milling or etching operation comprises performing ion beam etching.

5. The method according to claim 1, wherein the milling or etching operation is stopped before exposing the stop layer.

6. The method according to claim 1, wherein the step of performing the polishing operation comprises performing chemical mechanical polishing (CMP).

7. The method according to claim 6, wherein a CMP selectivity between the magnetic material and the stop layer is greater than 300:1.

8. The method according to claim 1, wherein the stop layer comprises diamond-like carbon.

9. The method according to claim 1, wherein the buffer layer comprises $AlO_x$, where x is a positive integer.

10. The method according to claim 1, wherein the magnetic material comprises CoNiFe, CoFe or NiFe.

11. The method according to claim 1, wherein the first sacrificial material comprises photoresist.

12. The method according to claim 1, wherein the second sacrificial material comprises alumina.

13. The method according to claim 1, further comprising the step of forming the damascene trench in the substrate layer by:
    forming a patterned mask layer over the substrate layer; and
    etching a region of the substrate layer exposed by the patterned mask layer to form the damascene trench.

14. The method according to claim 13, wherein the step of forming the damascene trench in the substrate layer further comprises:
    disposing a layer of alumina over the wafer to adjust a width of the damascene trench.

15. The method according to claim 1, wherein the substrate layer comprises alumina.

16. A method of forming a plurality of write poles, comprising the steps of:
    forming a plurality of damascene trenches in a substrate layer of a wafer;
    forming a stop layer over the substrate layer of the wafer after the step of forming the plurality of damascene trenches, the stop layer having a first plurality of openings above the plurality of damascene trenches in the substrate layer;
    forming a buffer layer over the stop layer, the buffer layer having a second plurality of openings above corresponding ones of the first plurality of openings of the stop layer;
    plating a layer of magnetic material over the wafer after the stop layer and the buffer layer are formed;
    disposing a first sacrificial material over a plurality of regions of the magnetic material above corresponding ones of the plurality of damascene trenches;
    performing a milling or etching operation over the wafer to remove the magnetic material not covered by the first sacrificial material and to remove the first sacrificial material;
    disposing a second sacrificial material over the wafer; and
    performing a polishing operation over the wafer to remove the plurality of regions of the magnetic material above the corresponding ones of the plurality of damascene trenches, to remove the second sacrificial material, and to remove the buffer layer.

17. The method according to claim 16, further comprising the step of disposing a seed layer over the wafer before plating the magnetic material over the wafer.

18. The method according to claim 17, wherein the step of performing the milling or etching operation further removes a portion of the seed layer not covered by the first sacrificial material.

* * * * *